United States Patent [19]
Wereb

[11] 4,415,049
[45] Nov. 15, 1983

[54] ELECTRICALLY POWERED VEHICLE CONTROL

[75] Inventor: John A. Wereb, Concord, Ohio

[73] Assignee: Instrument Components Co., Inc., Painesville, Ohio

[21] Appl. No.: 301,872

[22] Filed: Sep. 14, 1981

[51] Int. Cl.³ .............................................. B62D 11/04
[52] U.S. Cl. ............................... 180/6.5; 180/DIG. 3; 318/60; 318/67; 318/269
[58] Field of Search .................. 180/6.5, 907; 318/60, 318/59, 67, 269, 331, 375

[56] References Cited

U.S. PATENT DOCUMENTS

| | | | |
|---|---|---|---|
| 3,812,929 | 5/1974 | Farqué | 180/6.5 |
| 3,893,530 | 7/1975 | Gordon | 180/6.5 |
| 4,296,361 | 10/1981 | Archer | 318/60 |

Primary Examiner—John A. Pekar
Attorney, Agent, or Firm—Pearne, Gordon, Sessions, McCoy, Granger & Tilberry

[57] ABSTRACT

An electric control is disclosed for an electrically powered vehicle having independently controlled left and right drive motors and associated drive wheels to propel and steer the vehicle. The electrical control includes left and right closed loop control circuits for respectively accelerating either or both of the drive wheels whenever a speed command or error signal associated with such drive wheel exceeds a first determined value. Dynamic braking is provided by connecting in parallel electrical relationship an associated brake resistor across one or both of the motors whenever the speed command signal associated with such motor does not exceed a second predetermined value.

8 Claims, 5 Drawing Figures

ELECTRICALLY POWERED VEHICLE CONTROL

BACKGROUND AND SUMMARY OF THE INVENTION

The present invention relates to electric vehicles and, more particularly, to controls for electrically powered vehicles having differential drive and steering systems. In accordance with the present invention, electrically powered vehicles of improved handling, maneuverability, and overall driving characteristics are provided. The improvements of the present invention are especially advantageous when incorporated in small personal vehicle carriers such as electric wheelchairs, since the improved smoothness of operation and stability are of special importance to operators or vehicle drivers who are physically impaired.

The prior art controls for electrically powered wheelchairs and the like display undesirable operational characteristics, including abrupt movement in operation or "jerkiness", and tend to require an undue amount of effort to establish or regain directional control in dynamic situations. To a large degree, the deficiencies of the prior art controls are believed to be based upon a failure to recognize the unique operating characteristics and control requirements of differentially powered vehicles.

The vehicles of concern herein typically include left and right drive wheels which cooperate with one or more nondriven wheels to fully support the vehicle in a stable condition. The nondriven wheels may be free-turning caster wheels. Each drive wheel is independently driven in both speed and direction by an associated direct current electric drive motor so that the vehicle can be caused to move forward or backwards, or to turn right or left.

The steering function is provided by controlling the relative speed and direction of rotation of the drive wheels. If both drive wheels are operated at the same speed and rotated in the same direction, the vehicle travels in a straight line. The operation of the wheels at different speeds achieves turning of the vehicle, with the higher speed wheel tracking along the outer circumference of the path of the turning vehicle and the lower speed wheel tracking along the inside circumference of the path.

The relative speed and direction of rotation of the wheels are regulated by controlling the associated drive motors. To that end, motor speed is controlled by varying the voltage applied to the motor and motor direction is changed by reversing the polarity of the applied voltage. The prior art provides two methods of control, which are referred to herein as Alpha and Beta as defined below and subsequently contrasted with the novel Gamma method of the present invention.

The Alpha method comprises a relatively simple technique to achieve steering control and to effect relative speed differences between the drive wheels. The Alpha method adopts the simple and direct expedient of allowing the inside drive wheel to slow down by removing or reducing the applied voltage to the associated inside drive motor. Friction will gradually cause the inside motor to go slower, and the vehicle will turn. The disadvantages of this system are that it exhibits considerable delay in steering, which results in poor controllability, and it has a runaway potential on downward grades unless excessive friction is designed into the drive mechanism.

The Beta method provides certain improvements over the Alpha method in respect to controllability. In accordance with the Beta method, the outside wheel is caused to increase in speed in order to effect turning. The inside wheel is allowed to coast to a lower speed at the same time. As compared with the Alpha method, the Beta method provides improved controllability, since the response to speed of the outside motor is forced, and therefore turning starts immediately. However, the Beta method of control is not entirely satisfactory, since the inside wheel will still coast to a lower speed at rates which are affected by the smoothness of the surface along which the vehicle is traveling. The Beta method remains subject to downgrade runaway possibilities and difficulties encountered in reducing the speed of the vehicle unless there is excessive friction in the system.

The prior art also discloses the use of dynamic braking techniques wherein the overrunning of a direct current drive motor is rapidly decelerated by causing the motor to act as a generator and converting the inertial energy to heat energy by shunting the armature of the motor across a braking resistor through the use of switching means (see U.S. Pat. Nos. 2,892,506 and 3,792,328). In accordance with the prior art teachings, the manual operation of a control member by a vehicle driver to a neutral position causes the switching means in the circuit to electrically connect the braking resistor across the motor in order to cause deceleration. This method offers some improvements in stopping and steering, but the vehicle movement is still characterized by an abruptness or jerkiness.

In accordance with this prior art dynamic braking technique, the braking function is only provided if the vehicle driver manually moves the control member to a zero speed, or neutral condition. Consequently, the primary attribute of this prior art technique is prevention of runaway on ramps and provision of quick stops when needed. However, deflection of the joystick from the zero speed or neutral position will release the dynamic brake and permit the vehicle to coast downhill at excessive speeds.

The Gamma method of control of the present invention departs from the foregoing prior art methods and techniques by simultaneously controlling the acceleration and deceleration of each of the drive motors to achieve the relative speed relationships necessary to the steering and speed conditions selected by operation of a manual control member by the vehicle driver. To that end, brake means operable to decelerate each of the drive wheels are provided and the control method operates to selectively drive, brake, or freewheel each of the drive wheels. Thus, turning is effected in the Gamma method by simultaneously driving the outside wheel to increase its speed and braking the inside wheel to decrease its speed.

In accordance with the Gamma method, an electrical control is provided. The control includes an electronic feedback loop for comparing electrical input control signals corresponding with desired drive wheel speeds with sensed output feedback signals corresponding with the actual speed of the drive wheels. The electrical control operates to retard the rotation of either drive motor whenever excessive output speed is sensed by the electrical control.

In the illustrated embodiment, the electrical control includes a closed-loop control circuit or servo system for each of the drive wheels. A braking resistor is arranged in the control circuit for dynamic braking in accordance with sensed operating conditions. The energization, consisting of applied voltage and/or back EMF of each drive motor, is monitored to provide a feedback signal which is compared with an electrical input control signal derived from a control member, such as a joystick manually operated by the driver of the vehicle. In accordance with this comparison, the voltage applied to the drive motor may be increased in order to accelerate the drive wheel, a braking switch may be operated to effect dynamic braking of the drive motor and deceleration of the drive wheel, or freewheeling of the drive motor may occur temporarily as the system moves between the acceleration and braking modes.

In contrast with prior art systems, the present invention provides simultaneous acceleration and deceleration of opposed or left and right drive wheels to effect positive and smooth steering. By virtue of both acceleration and deceleration, the vehicle control is not varied as a function of frictional ground conditions, as occurs in the prior art Alpha and Beta methods to effect slowing of the inside drive wheel.

The dynamic braking function per se, in accordance with the prior art teachings, is of limited value, since it is not automatic in that the braking function is dependent upon the vehicle driver's return of the control member or joystick to a zero speed or neutral position. In the Gamma method, the braking function is operable at a rate governed by the gain of the control system and braking can occur, therefore, tens, hundreds, or thousands of times per second. In stark contrast with the rate of braking in the prior art, the dynamic braking function in the Gamma method is more aptly referred to as "dynamic damping." This dramatic difference in the rate of brake application is perceivable by a vehicle occupant in terms of improved smoothness of operation and stability.

The closed-loop control of the Gamma method enables controlled speed during downgrade travel, which is not possible in the prior art dynamic braking systems or in the Alpha or Beta systems. The Gamma method also effects control of the smoothness of deceleration and motion reversal. With regard to the latter, the speed of operation of the drive motors can be significantly decreased before reversal is permitted.

BRIEF DESCRIPTION OF THE DRAWINGS

These and other features and advantages of the invention will more readily apparent upon an understanding of the preferred embodiment of the invention shown in the accompanying drawings, wherein.

DETAILED DESCRIPTION OF THE DRAWINGS

Figure 1:
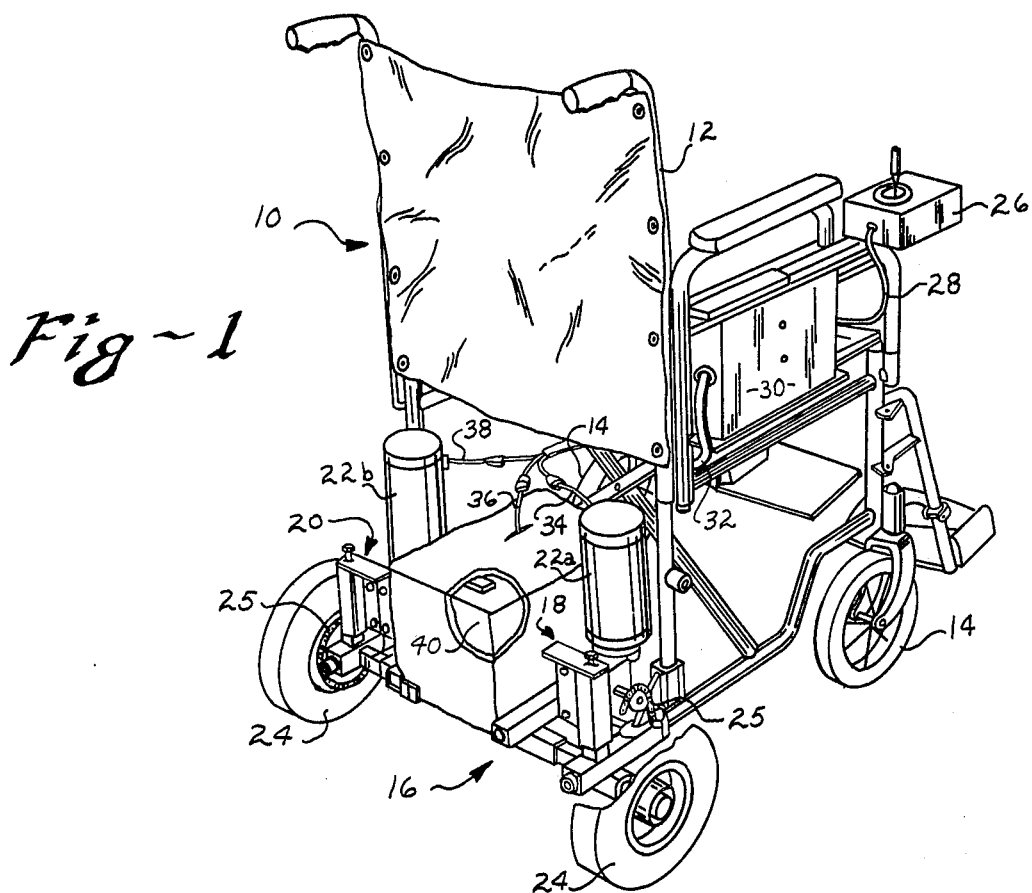
FIG. 1 is a perspective view of an electric wheelchair having a differential drive and steering system and provided with an electrical control in accordance with the present invention.

Referring to the drawings in greater detail, FIG. 1 shows an electric wheelchair 10 having a chair support and frame structure 12. The chair has two free-turning front wheels 14 and a rearwardly located electromechanical drive unit 16. The drive unit 16 includes a right wheel drive assembly 18 and a left wheel drive assembly 20.

The drive wheel assemblies 18 and 20 are mirror images of one another, and each one includes an electric motor and gear box 22, a drive wheel 24, and a drive chain 25 which extends between a sprocket on the output shaft of the electric motor and gear box 22 and a sprocket which is secured to the drive wheel 24 for rotation therewith. Each electric motor and gear box 22 includes a 24-volt direct current permanent magnet electric motor which drives the output shaft through a worm gear. As described in greater detail hereinafter, each of the drive wheel assemblies 18 and 20 is independently controlled in both speed and direction of rotation in order to steer and propel the chair 10.

A manually operable control member comprising a joystick potentiometer 26 is mounted to the chair 10 in a forward position for convenient operation by the chair occupant. A control cable 28 containing multiple wires insulated from one another electrically connects the potentiometer 26 with the electrical control of the present invention housed within the components box 30. A conduit 32 containing three multiple wire cables 34, 36, and 38 electrically connects the drive motors 22 to a battery 40 through the use of the electrical control housed within the components box 30.

As indicated above, the drive wheel assemblies 18 and 20 are independently controlled for purposes of propelling and steering the wheelchair 10. To that end, independent electrical controls are provided within the components box 30 for each of the drive wheel assemblies. Similarly, the potentiometer 26 provides independent control signals to the electrical controls. Such potentiometer control devices are known in the art, a suitable device being illustrated in U.S. Pat. No. 3,351,148.

Figure 2:
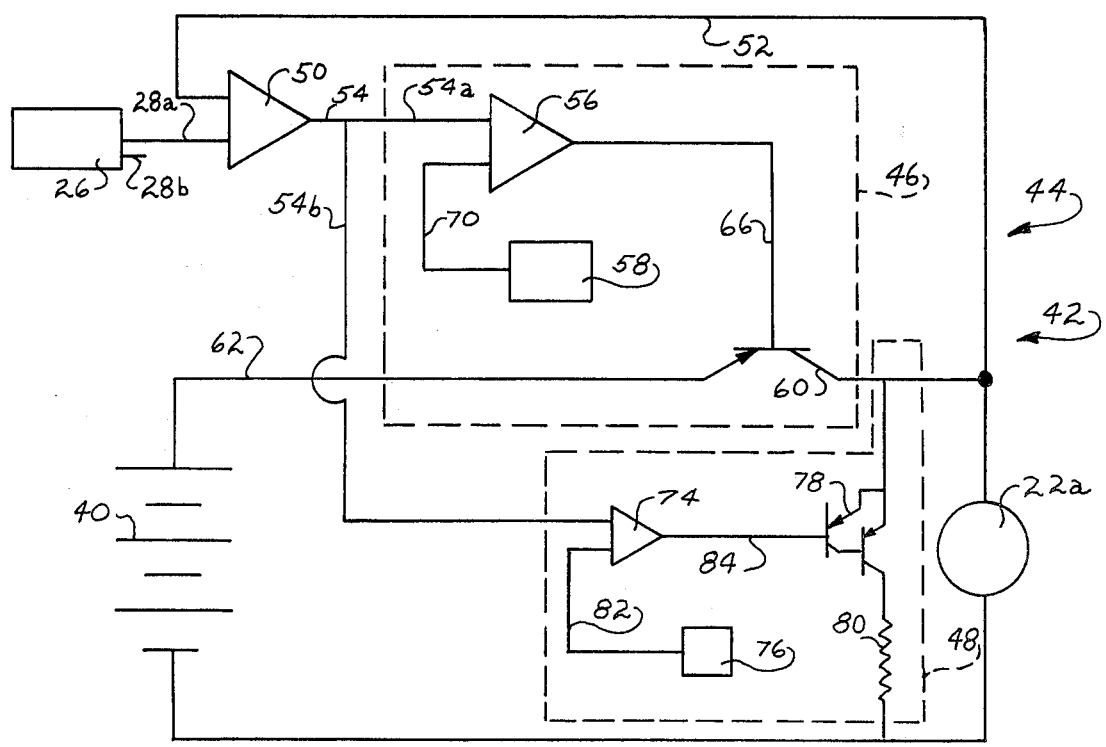
FIG. 2 is a schematic circuit diagram of the electrical control and drive for the wheelchair.

Referring to FIG. 2, an electrical control generally indicated by the reference numeral 42 is schematically illustrated in connection with the right drive wheel motor 22a. As noted above, an identical control circuit is provided for the left drive wheel motor 22b, the control signal for such circuit being passed through line 28b from the potentiometer 26.

For purposes of convenience, the electrical control circuit may be considered to include as principal functional parts a closed loop control circuit 44, a motor energizing network 46, and a dynamic brake network 48. As shown, the closed loop control circuit 44 includes the energizing network 46.

The control signal is passed through line 28a to a system or operational amplifier 50 connected in a comparator configuration. One-half of an RCA CA 3240 amplifier provides a suitable amplifier for the purposes herein. A feedback signal is passed via line 52 to the amplifier 50 for comparison with the control signal. The feedback signal corresponds with the output speed of the motor 22a and its associated drive wheel. In the illustrated embodiment, the feedback signal comprises the applied voltage and/or the back EMF voltage of the motor. The switching of the polarity of the motor for purposes of changing the direction of rotation of the drive wheel has no effect on the feedback signal in line 52 or the operation of the control. Of course, a separate tachometer (not shown) or a similar speed sensing device could be used for purposes of generating the feedback signal.

The control signal and the feedback signal are compared by the amplifier 50, and a speed command signal or error signal is passed from the amplifier via line 54. The speed command signal is proportional in magnitude to the difference between the control and feedback signals. The speed command signal operates either the motor energizing network 46 or the dynamic brake network 48, or, for a temporary transition period, neither network, and freewheeling occurs as described below.

For purposes of illustration, it is assumed that the sensed operating conditions require an increase in the speed of the motor 22a either to accelerate the chair 10 or to effect a turn to the left. Under these conditions, the speed command signal is in excess of a predetermined value and passes to the network 46 via line 54a. The primary components of the network 46 include a comparator 56, a reference signal source comprising a triangle wave oscillator 58, and a switching means comprising a power transistor 60. The transistor 60 is arranged to connect and disconnect the battery 40 from parallel electrical connection across the motor 22a via lines 62 and 64.

In the network 46, the comparator 56 may be provided by one-half of a 2903 comparator by National Semiconductor Corporation. For purposes of power modulation, any type of fixed frequency and amplitude reference signal source may be used. The oscillator 58 comprises a Type 555 triangle wave oscillator having a waveform 68 as diagrammatically shown in FIG. 4. The transistor 60 may comprise a Motorola 2N5685 power transistor.

The network 46 provides modulation or variation of the power applied to the motor 22a by means of pulse width modulation, resulting in a power modulating control signal passed to the transistor 60 via line 66. The modulation or variation of the power signal is achieved through regulation of the amount of time that the battery 40 is connected across the motor 22a.

The signal from the oscillator 58 is passed via line 70 to the comparator 56 for purposes of modulating the power signal in accordance with the magnitude of the speed command signal. The direct current waveform of the speed command signal is diagrammatically illustrated at two different magnitudes or voltage levels in FIG. 4 by waveforms 72a and 72b.

Figure 3:
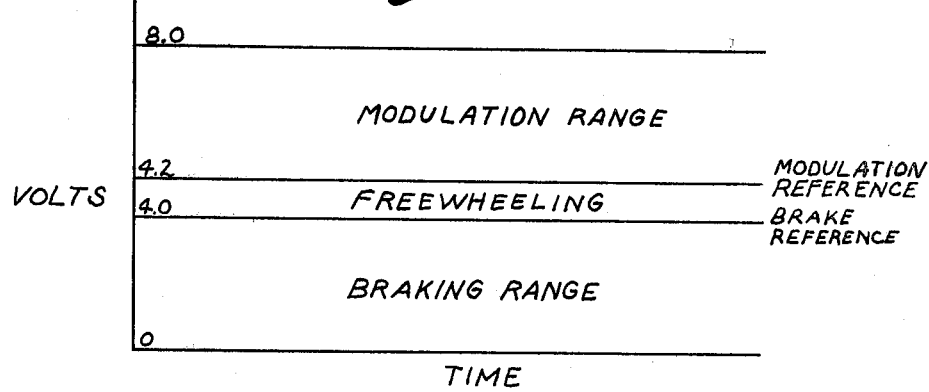
FIG. 3 is a graphic representation of illustrative reference voltage levels usable in the electrical control.
Figure 4:
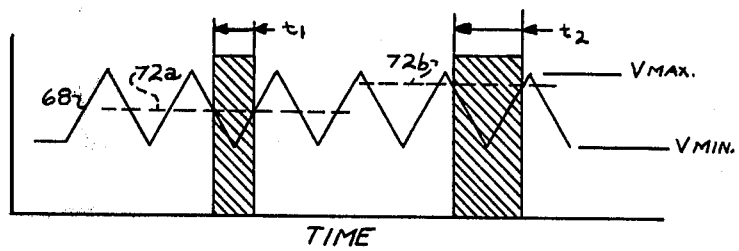
FIG. 4 is a graphic representation of a waveform having applied thereto two different pulse width determining control signals reflecting an increasing power signal to the wheelchair drive.

With reference to FIGS. 3 and 4, modulation of the power signal only occurs when the difference between the control and feedback signals is in excess of a predetermined value or reference voltage, arbitrarily selected to be 4.2 volts herein. When the difference between the control feedback signal is less than 4.2 volts, freewheeling or braking occurs, as described below in greater detail.

Referring to FIG. 4, the speed command signal 72a is shown at an intermediate value in the modulation range, which is characterized by a pulse width duration equal to $t_1$. During the time period $t_1$, the transistor 60 is closed and the battery 40 is connected across the motor 22a, the duration of the power voltage delivered to the motor being represented by the shaded area under the signal curve 72a.

The area under the increased speed command signal 72b represents an increase in the difference between the control and feedback signals or the desired speed of the wheel 24 associated with the motor 22a and the actual speed of such wheel. The proportional increase in the power modulating control signal carried in line 66 is characterized by an increased pulse width $t_2$, as shown in FIG. 4.

The power modulating control signal has a rectangular waveform as shown by the shaded area under the signal 72a or 72b in FIG. 4. The power signal applied to the motor 22a has a rectangular pulsed waveform corresponding with that of the power modulating control signal, since the former is provided by the latter's operation of the transistor 60. Thus, the duty cycle of the transistor 60 is also characterized by the waveforms of FIG. 4.

It should be appreciated that the power signal modulation or variation may be provided by techniques other than modulation of the pulse width duration. For example, frequency modulation or amplitude modulation may be employed. Similarly, it is not necessary that the reference source signal of the oscillator 58 comprise a triangle waveform. A sawtooth, sine, exponential or other symmetrical waveforms may be used.

With reference to FIG. 3, the control circuit provides a braking function when the difference between the control and feedback signals is less than a second predetermined value such as 4.0 volts herein. Thus, the power signal modulation range is separated from the braking range by the freewheeling buffer range. The freewheeling range is solely a transition region that is determined by the designed brake reference and modulation reference levels. These reference levels can actually overlap so that no freewheeling range exists.

In the braking mode, the speed command signal passes via line 54b to the dynamic brake network 48. The network 48 includes as its major components a brake system amplifier comprising an operational amplifier 74 connected in a comparator configuration, a brake reference signal source 76 comprising a suitable constant direct current signal source, and switching means comprising a transistor 78 arranged in series with a brake resistor 80. When the transistor 78 is operated to a closed condition, the resistor 80 is disposed in parallel across the armature of the motor 22a. In this manner, dynamic braking is effected by dissipating the back EMF developed by the overrunning motor 22a as heat energy within the resistor 80. This serves to rapidly decelerate the motor 22a and retard the rotation of the associated drive wheel 24.

In the network 48. the amplifier 74 may be provided by the other half of the RCA CA 3240 amplifier used to provide the amplifier 50. The transistor 78 is a PNP power Darlington, part number 2N6298 by Motorola.

As indicated, the dynamic brake network 48 operates in an ON/OFF mode. Thus, a constant direct current signal, assumed to be 4.0 volts herein, is passed by the brake reference signal source 76 via line 82 to the comparator 74. If the speed command signal provided through line 54b is not greater than 4.0 volts, the comparator 74 passes a brake signal via line 84 to the transistor 78 to close the circuit and place the resistor 80 in parallel electrical relationship across the motor 22a. In this manner, dynamic braking is achieved and the overrunning motor is rapidly decelerated.

It should be appreciated that the transistors 60 and 78 are never closed at the same time. Aside from transitional freewheeling, the controlled motor is subjected to dynamic braking whenever it is not being accelerated by application of a power signal. In practice, dynamic braking does not occur until a predetermined time period following the removal of an accelerating or energizing power signal to the motor. This time period is of sufficient length to avoid braking due to the rectangular pulsed waveform of the power signal, which includes the opening of the battery circuit by the transistor 60 during its duty cycle.

Figure 5:
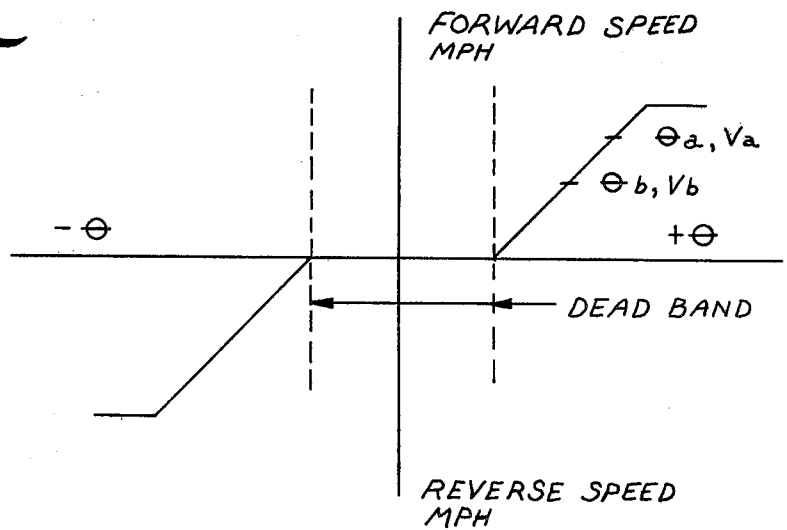
FIG. 5 is a graphic representation showing the relationship between wheelchair speed and joystick displacement.

Referring to FIG. 5, vehicle speed is graphically related to joystick displacement in accordance with the electrical control of the present invention. Initially, reference is made to the dead band mechanical displacement range, in degrees, corresponding with the neutral position of the joystick. This range is provided so that joysticks will permit zero speed even if they cannot return to an accurate zero displacement condition. Dirt, misalignment, and static friction usually prevent the mechanical zero to be reached and, therefore, the dead band range is typically designed into joystick controls.

In accordance with the electrical control of the present invention, dynamic braking capability is provided over the entire range of joystick displacement, contrary to prior art systems wherein braking is limited to the dead band range. In illustration of continuous braking capability, reference is made to an assumed speed-stabilized operation at joystick displacement $\theta_a$ at velocity $V_a$. If the joystick is moved to $\theta_b$ to command a slower speed $V_b$, the dynamic brake will be energized to cause the vehicle to decelerate to speed $V_b$. As soon as speed $V_b$ is reached, the brake will automatically turn off and the power signal voltage will again be applied as required to maintain speed $V_b$. The system will now be stabilized at $(\theta_b, V_b)$. This process will repeat itself automatically, as necessary, for further reductions in speed. If the speed is to be increased from $V_b$ to $V_a$, the brake will be turned off until speed $V_a$ is reached and the brake will remain off as long as the motor requires power.

Under the circumstance of going downgrade, where gravity may be forcing the motor to turn and run away, the brake will automatically come on until the vehicle slows to a desired downgrade speed, such as $V_b$. In contrast herewith, prior art systems limited to dead band braking will allow the vehicle to run away downhill unless the joystick is returned to the dead band range. On the other hand, the present invention allows smooth control of the vehicle, both in speed and direction, regardless of whether travel is downgrade, upgrade, or level.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An electrically powered vehicle having a differential drive and steering system comprising right and left drive wheel assemblies which each include a direct current motor and a drive wheel, a source of electric power for providing a power signal to each of said drive motors, an electrical control for controlling the operation of said drive motors, and a control member manually operable to provide electrical control signals to said electrical control for each of said drive motors, said electrical control including a motor-energizing network and a dynamic brake network for each of said drive wheel assemblies to selectively cause the driving, braking, or freewheeling of each of said drive wheels, said motor energizing network including a feedback loop for comparing said control signal with a feedback signal corresponding with the speed of said drive wheel and providing a speed command signal to regulate said power signal to energize said motor when said speed command signal is above a first predetermined value, said speed command signal being proportional in value to the speed of said motor, said dynamic brake network including a braking resistor and switch means operable to a closed condition in response to a decrease of said speed command signal below a second predetermined value to configure said braking resistor in electrical parallel relationship with said motor and provide dynamic braking to retard the rotation of said drive wheel, said motor energizing network also including power signal modulator means for varying said power signal in accordance with the magnitude of said speed command signal, said power signal modulator means including energizing switch means operable to electrically connect and disconnect said source of electric power and said motor, said power signal modulator means also including a source for providing a fixed frequency and amplitude reference signal which is compared with said speed command signal to provide a power-modulating control signal which is proportional to said speed command signal.

2. An electrically powered vehicle as set forth in claim 1, wherein said power-modulating control signal is of variable pulse width duration in proportion to the value of the speed command signal.

3. An electrically powered vehicle as set forth in claim 1, wherein said braking resistor is in series with braking switch means and said braking network is connected in electrical parallel relationship with said motor.

4. An electrically powered vehicle having a differential drive and steering system comprising right and left drive wheel assemblies which each include a direct current drive motor and a drive wheel, a source of electric power for providing a power signal to each of said motors, manually adjustable means for providing electrical control signals indicative of desired drive wheel speeds, means for providing feedback signals indicative of actual drive wheel speeds, and means responsive to said control and feedback signals for varying the power applied to each of the direct current motors to attain and maintain the desired drive wheel speeds and to effect steering, said means for varying the power including a dynamic braking network associated with each of said drive wheels for automatically connecting a resistive load in parallel with the direct current motor when the actual speed of the drive wheel exceeds the desired speed of the drive wheel by a predetermined degree, said means for providing a feedback signal including a closed loop control circuit arranged to provide a speed command signal which is proportional to the difference between the control signal and the feedback signal, said feedback signal being a direct measurement of the voltage on the armature of said motor, said means for varying the power including power signal modulator means for varying said power signal in accordance with the magnitude of said speed command signal, said power signal modulator means including energizing switch means operable to electrically connect and disconnect said source of electric power from said motor, said power signal modulator means including a source for providing a fixed frequency and amplitude reference signal which is compared with said speed command signal to provide a power-modulating control signal which is proportional to said speed command signal.

5. An electrically powered vehicle as set forth in claim 4, wherein said power-modulating control signal is of variable pulse width duration in proportion to the value of the speed command signal.

6. An electrically powered vehicle having a differential drive and steering system comprising right and left drive wheel assemblies which each include a direct current motor operably connected to a drive wheel, a source of electric power for providing a power signal to each of said motors, manually adjustable means for providing electrical control signals indicative of desired drive wheel speeds, means for providing feedback signals indicative of actual drive wheel speeds, and an electrical control circuit including a closed loop control circuit to provide a speed command signal proportional in magnitude to differences between said control and feedback signals, a motor energizing network to vary the power signal to said motor in proportion with the magnitude of said speed command signal at values thereof in excess of a first predetermined value, and a dynamic brake network including brake means operable to decelerate each of said motors together with its associated drive wheel in response to speed command signals lower in value than a second predetermined value, said dynamic brake network including power signal modulator means for varying said power signal in accordance with the magnitude of said speed command signal, said power signal modulator means including energizing switch means operable to electrically connect and disconnect said source of electric power from said motor, said power signal modulator means also including a source for providing a fixed frequency and amplitude reference signal which is compared with said speed command signal to provide a power modulating control signal which is proportional to said speed command signal.

7. An electrically powered vehicle as set forth in claim 6, wherein said power-modulating control signal is of variable pulse width duration in proportion to the value of the speed command signal.

8. An electrically powered vehicle as set forth in claim 6, wherein said brake means comprise a brake resistor in series with switch means, said dynamic brake network being connected in electrical parallel relationship with said motor.

* * * * *